W. FLYNN.
Gates.

No. 154,382.  Patented Aug. 25, 1874.

WITNESSES:

INVENTOR:
W. Flynn
BY
ATTORNEYS.

UNITED STATES PATENT OFFICE.

WILLIAM FLYNN, OF SCOTLAND, MISSOURI.

IMPROVEMENT IN GATES.

Specification forming part of Letters Patent No. 154,382, dated August 25, 1874; application filed May 23, 1874.

*To all whom it may concern:*

Be it known that I, WILLIAM FLYNN, of Scotland, in the county of Jasper and State of Missouri, have invented a new and useful Improvement in Gates, of which the following is a specification:

The invention will first be fully described, and then pointed out in the claim.

Figure 1:
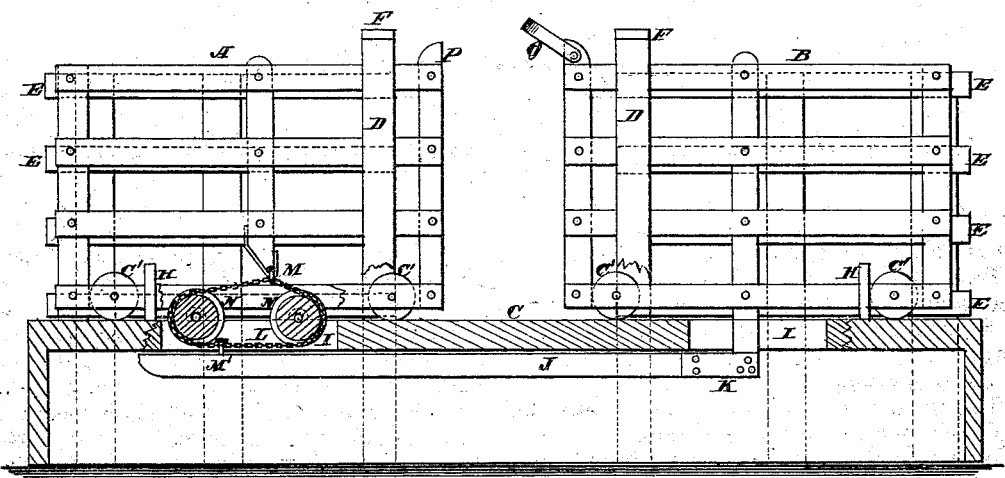
Figure 2:
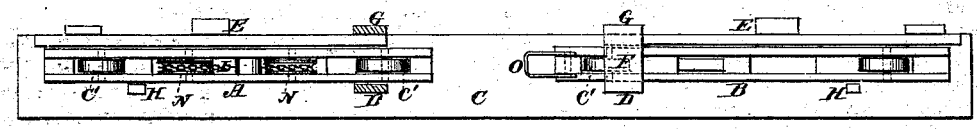

In the drawing, Figure 1 is a side elevation, partly in section, and Fig. 2 is a top view.

Similar letters of reference indicate corresponding parts.

This gate is made in two parts, A and B, which are connected together and move simultaneously, one to the right and the other to the left. C is the hollow foundation, the top of which is level, or nearly level, with the surface of the ground. These two parts are each provided with truck-wheels $e'$, on which they move back and forth on the top of the foundation. This gate is placed at the side of a fence opening, and each part is kept in an upright position by the guide-post D D, on the side of the gate opposite the fence. E is the fence, the posts of which are attached to the foundation C, as indicated by the dotted lines in Fig. 1. The guide-posts D D enter the foundation, and their tops are connected, by the cross-pieces F F, with the posts G G of the gateway. H H are short posts, attached to the top of the foundation, which serve to guide the back ends of the two parts. I I are slot-holes in the top of the foundation. The two parts of the gate are connected by means of the bar J beneath the top of the foundation, which is attached to the part B, as seen at K, and by the chain L attached to the bar J and part A, as seen at M M'. This is an endless chain and revolves around the two chain-pulleys N N, the arbors or shafts of which rest in boxes on the top of the foundation C, while the pulleys project down through one of the slots I I. By this arrangement it will be seen that by applying power to either part of the gate the parts will move to either open or close the gate. O is a device for fastening, attached to one part, which, when the gate is closed, is placed over the upright P of the other part to hold the parts together.

This gate is easily constructed, durable, and easily operated. The closing of the gate may be effected by a spring or a weight, if desired. These gates may be made of any desired size, the parts being proportioned according to the purpose for which it is to be used.

Having thus described my invention, I claim as new and desire to secure by Letters Patent—

The combination of the two parts A B, having wheels $C'$, and connected, by a bar, J, with slotted foundation C, chain L, and pulleys N N, as and for the purpose specified.

WILLIAM FLYNN.

Witnesses:
 FRANK S. WRIGHT,
 WILLIAM H. FLYNN.